United States Patent
Hase et al.

(10) Patent No.: US 12,181,667 B2
(45) Date of Patent: Dec. 31, 2024

(54) VEHICLE WINDSHIELD FOR USE WITH HEAD-UP DISPLAY SYSTEM

(71) Applicant: ACR II GLASS AMERICA INC., Nashville, TN (US)

(72) Inventors: Hiromi Hase, Saitama (JP); Michael Bard, Wadern (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 680 days.

(21) Appl. No.: 17/430,516

(22) PCT Filed: Feb. 13, 2020

(86) PCT No.: PCT/US2020/018099
§ 371 (c)(1),
(2) Date: Aug. 12, 2021

(87) PCT Pub. No.: WO2020/168069
PCT Pub. Date: Aug. 20, 2020

(65) Prior Publication Data
US 2022/0137405 A1  May 5, 2022

Related U.S. Application Data

(60) Provisional application No. 62/805,393, filed on Feb. 14, 2019.

(51) Int. Cl.
G02B 27/01 (2006.01)
G02B 1/11 (2015.01)

(52) U.S. Cl.
CPC ............ G02B 27/0101 (2013.01); G02B 1/11 (2013.01); *G02B 2027/013* (2013.01)

(58) Field of Classification Search
CPC .... G02B 27/01; G02B 27/013; G02B 27/017; G02B 27/0101; G02B 27/0172;
(Continued)

(56) References Cited

U.S. PATENT DOCUMENTS 4,273,826 A  6/1981  McCollister et al.
4,368,945 A  1/1983  Fujimori et al.
(Continued)

FOREIGN PATENT DOCUMENTS

CN  207148424 U  3/2018
EP     492785 A1  7/1992
(Continued)

OTHER PUBLICATIONS

International Search Report and the Written Opinion for International application No. PCT/US2020/018099, filed Feb. 13, 2020, mailed on May 7, 2020, by International Search Authority/US, 8 pages.
(Continued)

*Primary Examiner* — Sultan Chowdhury
(74) *Attorney, Agent, or Firm* — K&L Gates LLP

(57) ABSTRACT

Certain example embodiments relate to a vehicle windshield with a head-up display system, including first and second spaced-apart substrates sandwiching a polymer-inclusive interlayer therebetween, and an anti-reflective coating provided on an exterior surface of the first substrate or an interior surface of the second substrate in opposite to the polymer-inclusive interlayer. An image source directing light rays towards one of the substrates, has an light emission profile showing the strongest light strength at a first wavelength, whereas the anti-reflective coating has a broad reflectance spectrum, showing the lowest reflectance at a second wavelength, which substantially matches the first wavelength.

16 Claims, 6 Drawing Sheets

(58) Field of Classification Search
CPC ...... G02B 2027/013; G02B 2027/0105; G02B 2027/0141; G02B 5/00; G02B 5/003; G02B 5/1861; G02B 5/1866; G02B 5/3083; G02B 1/10; G02B 1/11; G02B 1/111; G02B 1/115
See application file for complete search history.

(56) References Cited

U.S. PATENT DOCUMENTS

| | | |
|---|---|---|
| 4,910,380 A | 3/1990 | Reiss et al. |
| 4,946,491 A | 8/1990 | Barr |
| 6,277,480 B1 | 8/2001 | Veerasamy et al. |
| 6,387,513 B1 | 5/2002 | Beyrle et al. |
| 6,492,029 B1 | 12/2002 | Beyrle |
| 6,589,658 B1 | 7/2003 | Stachowiak |
| 7,121,380 B2 | 10/2006 | Garnier et al. |
| 7,147,924 B2 | 12/2006 | Stachowiak |
| 7,864,431 B2 | 1/2011 | Martin |
| 8,497,021 B2 | 7/2013 | Simpson et al. |
| 8,506,001 B2 | 8/2013 | Gutierrez |
| 8,741,158 B2 | 6/2014 | Aytug et al. |
| 9,272,947 B2 | 3/2016 | Baca et al. |
| 9,376,589 B2 | 6/2016 | Maghsoodi et al. |
| 9,400,343 B1 | 7/2016 | Pethuraja et al. |
| 9,771,656 B2 | 9/2017 | Aytug et al. |
| 2002/0045037 A1 | 4/2002 | Boire et al. |
| 2004/0028918 A1 | 2/2004 | Becker et al. |
| 2006/0188730 A1 | 8/2006 | Varanasi et al. |
| 2006/0275595 A1 | 12/2006 | Thies et al. |
| 2007/0020465 A1 | 1/2007 | Thiel et al. |
| 2008/0038458 A1 | 2/2008 | Gemici et al. |
| 2009/0303604 A1 | 12/2009 | Martin |
| 2010/0167046 A1 | 7/2010 | Thies et al. |
| 2010/0253601 A1 | 10/2010 | Seder et al. |
| 2012/0088066 A1 | 4/2012 | Aytug et al. |
| 2013/0067957 A1 | 3/2013 | Zhang et al. |
| 2013/0157008 A1 | 6/2013 | Aytug et al. |
| 2013/0157026 A1 | 6/2013 | Kotani et al. |
| 2013/0215513 A1 | 8/2013 | Liang et al. |
| 2013/0233018 A1 | 9/2013 | Takashima et al. |
| 2013/0236695 A1 | 9/2013 | Aytug et al. |
| 2014/0104690 A1* | 4/2014 | Sandre-Chardonnal .................... B32B 17/10706 156/212 |
| 2014/0106150 A1 | 4/2014 | Decker et al. |
| 2014/0232707 A1 | 8/2014 | Alschinger et al. |
| 2015/0004369 A1* | 1/2015 | Eby .......... C03C 17/36 156/99 |
| 2015/0077854 A1 | 3/2015 | Yu et al. |
| 2015/0160377 A1 | 6/2015 | Kuroda et al. |
| 2015/0160462 A1 | 6/2015 | Takahara |
| 2015/0239773 A1 | 8/2015 | Aytug |
| 2015/0260994 A1* | 9/2015 | Akutsu ............ G02B 27/0172 385/37 |
| 2016/0002498 A1 | 1/2016 | Maghsoodi et al. |
| 2016/0011414 A1* | 1/2016 | Joseph ............... C03C 17/3435 359/609 |
| 2016/0257095 A1 | 9/2016 | Cleary et al. |
| 2016/0264451 A1 | 9/2016 | He et al. |
| 2016/0266438 A1* | 9/2016 | Takahashi ......... G02F 1/133553 |
| 2016/0289498 A1 | 10/2016 | Yang et al. |
| 2016/0313603 A1 | 10/2016 | Walther et al. |
| 2017/0015180 A1 | 1/2017 | Sakamoto et al. |
| 2017/0221680 A1 | 8/2017 | Yu et al. |
| 2017/0242247 A1 | 8/2017 | Tso et al. |
| 2017/0363863 A1 | 12/2017 | Chen |
| 2018/0045956 A1* | 2/2018 | Skrypchuk ............ B60K 35/00 |
| 2018/0088326 A1* | 3/2018 | Lambert ................. G02B 5/30 |
| 2019/0064516 A1* | 2/2019 | Wagner ............. G02B 27/0101 |
| 2019/0252086 A1 | 8/2019 | Kato et al. |
| 2019/0255812 A1 | 8/2019 | Bard et al. |
| 2020/0238797 A1* | 7/2020 | Bard ....................... G02B 1/111 |
| 2020/0333593 A1 | 10/2020 | Bard et al. |

FOREIGN PATENT DOCUMENTS

| | | |
|---|---|---|
| EP | 494493 A1 | 7/1992 |
| EP | 519690 A1 | 12/1992 |
| EP | 1052525 A1 | 11/2000 |
| EP | 1286185 A1 | 2/2003 |
| EP | 2131227 A2 | 12/2009 |
| EP | 2990838 A1 | 3/2016 |
| ES | 2406205 A2 | 6/2013 |
| GB | 2065097 A | 6/1981 |
| IN | 02919DE2013 | 10/2015 |
| JP | 2002-338303 A | 11/2002 |
| JP | 2011-204649 A | 10/2011 |
| JP | 5157143 B2 | 3/2013 |
| WO | 2012/029261 A2 | 3/2012 |
| WO | 2012/074078 A1 | 6/2012 |
| WO | 2013/088700 A1 | 6/2013 |
| WO | 2015/199027 A1 | 12/2015 |
| WO | 2016/143470 A1 | 9/2016 |
| WO | 2017/135182 A1 | 8/2017 |
| WO | 2018/051638 A1 | 3/2018 |
| WO | 2018/178905 A1 | 10/2018 |

OTHER PUBLICATIONS

Extended Supplementary Search Report for related European Application No. 20756011.1; action dated Mar. 24, 2022; (8 pages).
Extended European search report for European application No. 18866284.5, mailed Feb. 4, 2021, 16 pages.
Wikipedia, "High-power impulse magnetron sputtering", retrieved on Apr. 7, 2020 from <<https://en.wikipedia.org/w/index.php?title=High-power_impulse_magnetron_sputtering&oldid=782190507>; 6 pages.
Aytug, et al., "Monolithic graded-refractive-index glass-based antireflective coatings: broadband/omnidirectional light harvesting and self-cleaning characteristics", Journal of Materials Chemistry C; vol. 3, No. 21; Jun. 2015; pp. 5440-5449.
Partial Supplementary European search report for European application No. 18866284.5, mailed Oct. 16, 2020, 13 pages.
Extended European Search Report for European Application No. 20756011.1, filed Feb. 14, 2019, mailed on Mar. 24, 2022, by the European Patent Office, 8 pages.

* cited by examiner

VEHICLE WINDSHIELD FOR USE WITH HEAD-UP DISPLAY SYSTEM

CROSS REFERENCE TO RELATED APPLICATION

This application is a national stage of PCT International Application No. PCT/US2020/018099, filed Feb. 13, 2020, and claims priority to U.S. provisional patent application Ser. No. 62/805,393, filed Feb. 14, 2019, entitled "WINDSHIELD FOR A VEHICLE FOR USE WITH A HEAD-UP DISPLAY SYSTEM," the entire content of which is incorporated herein by reference in its entirety.

FIELD OF THE INVENTION

The present disclosure relates to a vehicle windshield for use with a head-up display system including an anti-reflective coating that optically removes or limits a second or ghost image created by the reflection of an image from an image source.

BACKGROUND

To convey information to a viewer, head-up display (HUD) systems have been used to display images representing information through the windshield of the vehicle, thus reducing the need for a driver or pilot to turn attention away from the road to be driven on or the air space to be flown in. Recently, HUD systems have been used in automotive vehicles such as cars, trucks, and the like. The HUD systems are generally positioned so as to reduce the viewer's need to glance downward to the vehicle dashboard and/or away from the viewing area in front of the vehicle. Thus, a HUD system for use with an automotive vehicle is a visual display arrangement that displays information to a viewer in the form of a virtual image, typically situated in space above the hood of the car, so that the viewer can view the road and objects outside the vehicle around and through the display along with the display itself.

In some current configurations, a projection display emitting light rays may be positioned behind the steering wheel and may project light onto the windshield, which may reflect the light rays towards the driver or passenger to form an image viewable by the driver or passenger. More particularly, a HUD system generally includes a display projection system, a collimator, and a combiner. The projection system includes a light source that projects operating information through the collimator, which generally aligns the projected light rays.

The windshield has an inner surface (surface 4; S4) that can create a first image by reflecting light rays and an exterior surface (surface 1; S1) that can create a second image with the same information as the first image by reflecting the light rays. The phenomenon may provide double images visible to a driver or passenger because there are two reflections. For a HUD system, reducing the double images is needed in the art.

Reducing either the first image or the second image by an anti-reflective (AR) coating can be a solution. U.S. Pat. No. 7,864,431 B2 generally discloses a windshield using the AR coating on the S1 or S4 for the HUD system.

SUMMARY OF THE DISCLOSURE

In such a HUD system, it may be preferable that an image reflected on the windshield is in full-color. In order to realize a full-color HUD system, an AR coating on surface S1 or S4 may have anti-reflecting properties for the full-colored light rays comprising red, green, and blue lights. The AR coating having an AR property in the complete range of visible light wavelength is preferably applicable to such use. However, it is generally difficult to obtain an AR coating having such an AR spectrum.

Disclosed herein is a first embodiment which may include a vehicle windshield for use with a head-up display system, comprising: a first substrate facing a vehicle exterior; a second substrate facing a vehicle interior; a polymer-inclusive interlayer provided between the first and second substrates; an image source configured to direct, towards the second substrate, light rays corresponding to an image to be formed substantially by means of reflection off of an interior surface of the second substrate and seen by a viewer; and an anti-reflective coating provided on an exterior surface of the first substrate for preventing at least some of the light rays from being reflected off of the exterior surface of the first substrate and toward the viewer. The image source may project a light with a light strength spectrum over a visible wavelength range, having a strongest light strength at a first wavelength within the visible wavelength range, and an anti-reflective coating may have a broad reflectance spectrum over the visible wavelength range in a direction of the light rays, showing, within the range, the lowest reflectance at a second wavelength, wherein the second wavelength substantially matches the first wavelength. The windshield with such a head-up display system may reduce double images where the image source emits a full-colored spectrum of light rays. A full-colored spectrum of light rays may comprise a mixture of red, green and blue lights with a certain intensity respectively (RGB lights) and may have a certain light intensity spectrum over the visible wavelength range, which may vary depending on a type of an image source.

In accordance with an embodiment of the present disclosure, the first wavelength may be within 50 nm of the second wavelength. The first wavelength may preferably be from 400 nm to 500 nm. In yet further embodiments, the polymer-inclusive interlayer may be made of polyvinyl butyral (PVB), may have a substantially uniform thickness or a wedged shape, and may have a polarization rotator (e.g., phase difference plate, wave plate or retarder plate).

In another aspect of the present disclosure, a vehicle windshield for use with a head-up display system may include: a first substrate facing a vehicle exterior; a second substrate facing a vehicle interior; a polymer-inclusive interlayer provided between the first and second substrates; an image source configured to direct, towards the second substrate, light rays corresponding to an image to be formed substantially by means of reflection off of an exterior surface of the first substrate and seen by a viewer; and an anti-reflective coating provided on an interior surface of the second substrate for preventing at least some of the light rays from being reflected off of the interior surface of the second substrate and toward the viewer. The image source may project a light with a light strength spectrum over a visible wavelength range, having a strongest light strength at a first wavelength within the visible wavelength range, and an anti-reflective coating may have a broad reflectance spectrum over the visible wavelength range in a direction of the light rays, showing, within the range, the lowest reflectance at a second wavelength, wherein the second wavelength substantially matches the first wavelength.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1:
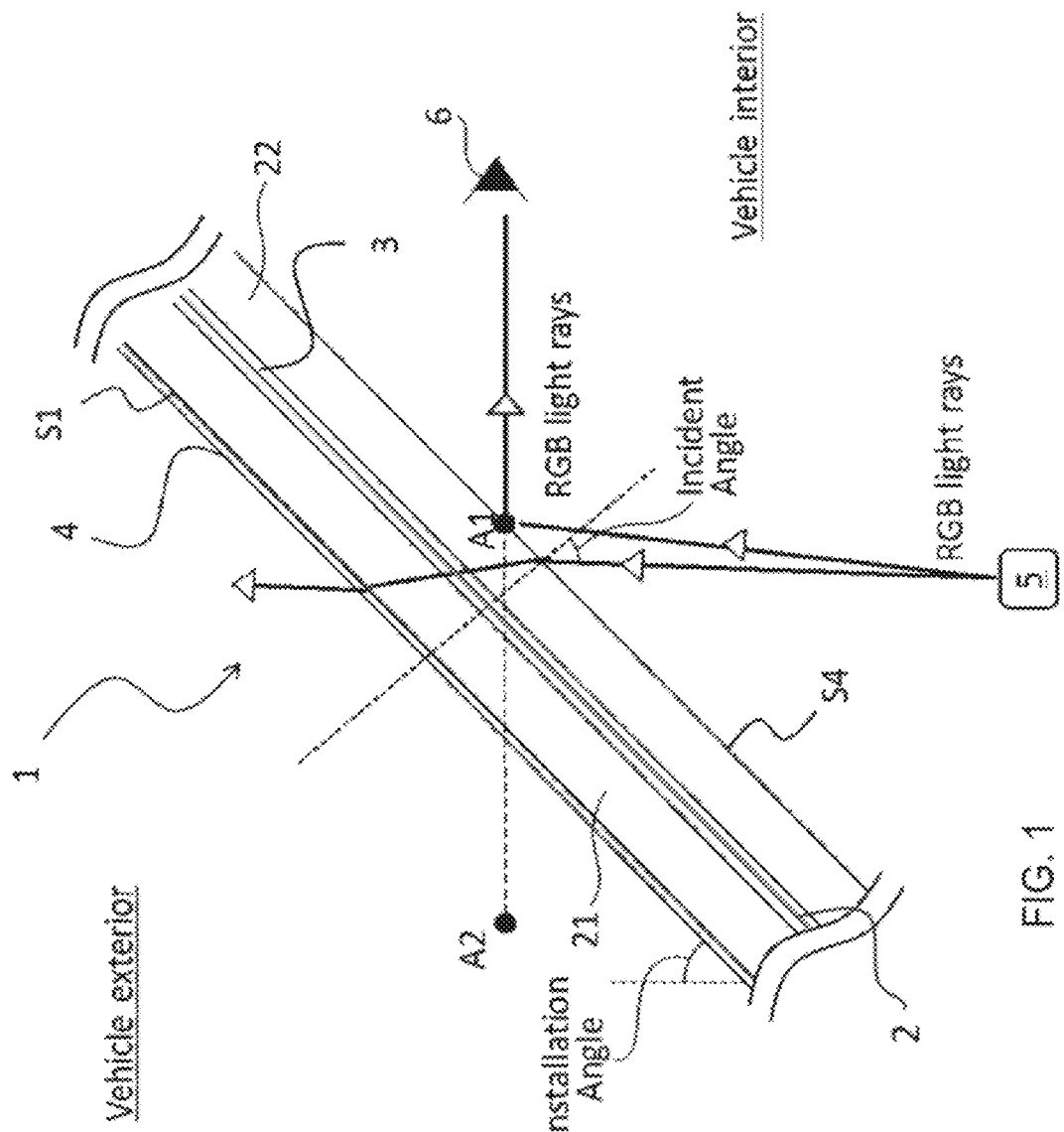
FIG. 1 illustrates schematic optical paths at a windshield with a head-up display system in a first embodiment of the present disclosure.

In certain example embodiments of the present disclosure, a vehicle windshield 1 with a HUD system is provided. The windshield 1 includes first and second spaced-apart glass substrates (21, 22) sandwiching a polymer-inclusive interlayer 3, and an AR (anti-reflective) coating 4 provided on an exterior or interior surface of the windshield. The exterior surface of the windshield 1 may be expressed as surface S1, the interior surface of the windshield 1 may be expressed as S4. An exterior surface of the first glass substrate 21 may be surface S1 and an interior surface of the second glass substrate 22 may be surface S4. The first glass substrate 21 may face the vehicle exterior, and the second glass substrate 22 may face the vehicle interior. An image source 5 may be configured to direct light rays, including red, green, and blue light rays (RGB light rays), corresponding to an image(s) to be reflected at the windshield 1.

As shown in FIG. 1, the windshield 1 may include an AR coating 4 disposed on surface S1. Where the AR coating 4 is on surface S1, a user 6 may observe a virtual image A2 based on a reflected image A1 of the RGB light rays off of surface S4. Since light reflected from surface S1, which may create a ghost image, may be eliminated or substantially eliminated by the AR coating 4, there may be no ghost image viewable to a user (driver or passenger).

The light rays (e.g., the RGB light rays) from the image source 5, which may include display panels such as, e.g., LCD displays, OLED displays, and CRT displays, may have a light strength spectrum at least partially over a visible light wavelength range, showing the strongest light strength at a first wavelength $\lambda_1$ within the range. Preferably, the visible light wavelength range may be from 380 nm to 780 nm. For example, the first wavelength $\lambda_1$ of some CRT displays may preferably be from 600 nm to 700 nm, the first wavelength $\lambda_1$ of some OLED displays may preferably be from 550 nm to 650 nm, and the first wavelength $\lambda_1$ of some LCD display may preferably be from 500 nm to 600 nm or from 400 nm to 500 nm depending on a type of back light of the LCD panel. The light rays may be non-polarized light rays, S-polarized light rays, or P-polarized light rays. An incident angle of the light rays to the surface S4 may be from 30 degrees to 75 degrees, preferably from 40 degrees to 70 degrees. The installation angle of a windshield and the angle of a projector may affect the incident angle as their relative positions affect the angle between light emitted and the windshield the light is directed to.

It may be difficult to obtain an AR coating having anti-reflective property in the complete range of visible light wavelengths. The anti-reflective property of the AR coating may depend on wavelength. The AR coating 4 may have a broad reflectance spectrum over at least part of the visible light wavelength range in a direction of the light rays, showing the AR property, with a lowest reflectance at a second wavelength $\lambda_2$ within the range. In certain embodiments, the AR property (to be measured as reflectivity of a windshield 1 as a function of wavelength) may be less than or equal to 2.5% of reflectance of light ray with incident angle of 45 degrees to the AR coating. In the windshield 1, by matching the first wavelength $\lambda_1$ with the second wavelength $\lambda_2$ to be in a prescribed range, double images may be eliminated or substantially eliminated.

It may be desirable to design the light emission profile of the image source 5 with the first wavelength $\lambda_1$ as the wavelength of the strongest light intensity in the source spectrum and to design the second wavelength $\lambda_2$ of the AR coating 4 to match the first wavelength $\lambda_1$. Matching of the two wavelengths $\lambda_1$, $\lambda_2$ in this specification particularly includes a state that the two wavelengths are substantially the same, as well as a state that the difference between the first and second wavelengths $\lambda_1$, $\lambda_2$ are in a range of plus or minus 50 nm, preferably plus or minus 30 nm, and more preferably plus or minus 15 nm. In a designing process of the windshield 1, the image source 5 may be selected with a specified light emission device and then the AR coating 4 may be designed to match the light emission device. When the image source 5 is set, the first wavelength $\lambda_1$ becomes apparent by simulations or actual measurements, and then, the AR coating 4 may be designed or chosen so as to reduce the light reflection at surface S1. The AR coating's reflection rate profile may be controlled by the number, thickness, kinds, and deposition method of respective thin film layers of the AR coating 4. In some methods, a low point in reflectivity may appear once or multiple times in the range of visible light wavelengths. Where multiple low points exist, the wavelength at the lowest reflection point may be selected as the second wavelength $\lambda_2$, and where the second wavelength $\lambda_2$ matches the first wavelength $\lambda_1$, the windshield 1 is able to effectively prevent double images. In another method, the second wavelength $\lambda_2$ may be set first based on an AR coating 4, and then the light emission profile of the image source 5 may be adjusted to match the wavelengths $\lambda_1$, $\lambda_2$ as in the prescribed range.

Figure 5:
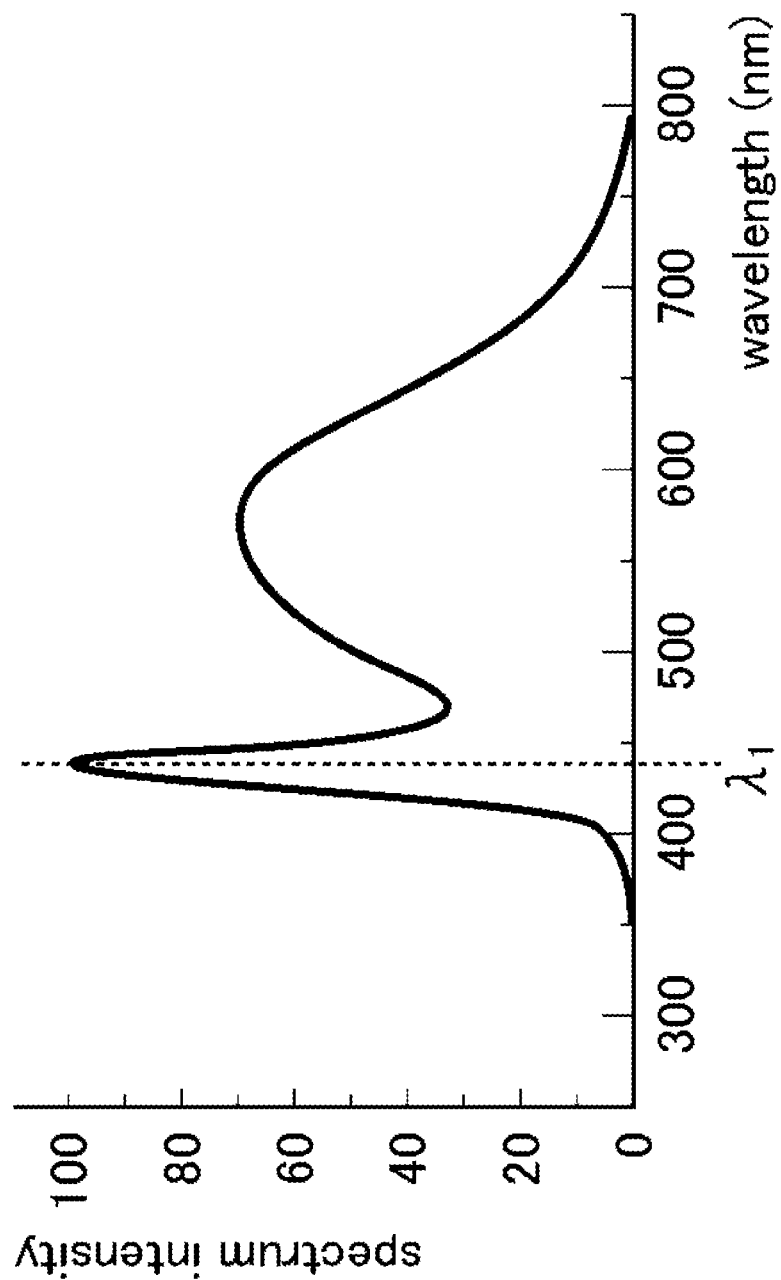
FIG. 5 illustrates an example graph showing a spectrum intensity on a wavelength basis of an image source in the first embodiment of the present disclosure.
Figure 6:
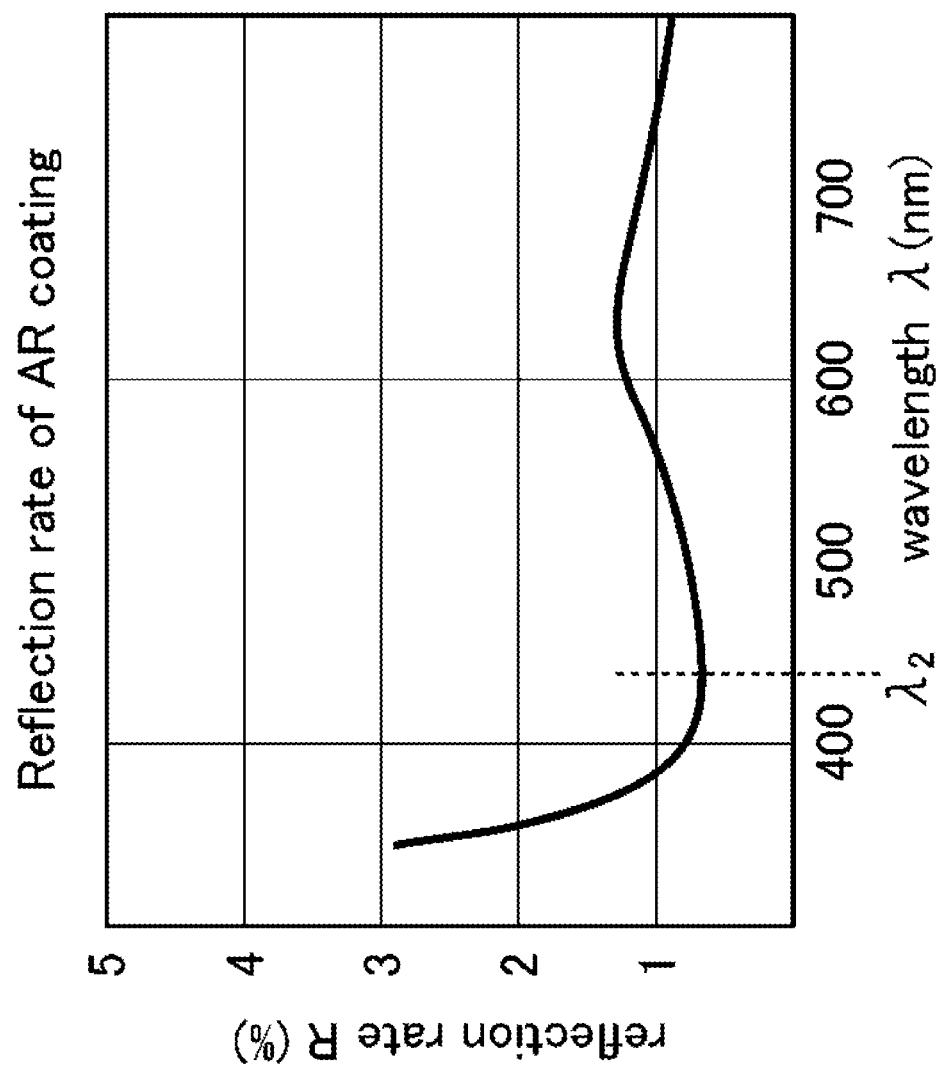
FIG. 6 illustrates an example graph showing a reflection rate on a wavelength basis of an anti-reflective coating in the first embodiment of the present disclosure.

FIGS. 5 and 6 show light intensity spectrum and a reflection rate profile of an example of a combination made of the image source 5 and the AR coating 4, respectively. FIG. 5 shows a light intensity spectrum of an image source 5 made of a liquid crystal display (LCD) having a white LED back light system. As shown in FIG. 5, the light emission profile depicted shows a peak around the wavelength of 440 nm, and the LCD therefore has a first wavelength $\lambda_1$ of 440 nm. Further, as shown in FIG. 6, the AR coating 4 indicates a point of the lowest reflection at as the second wavelength $\lambda_2$ of 440 nm, matching the wavelength $\lambda_1$ of 440 nm. Thus, the first and second wavelengths $\lambda_1$, $\lambda_2$ are within 50 nm of each other. With this combination of the image source 5 and the AR coating 4, the double images may be eliminated or substantially eliminated, because the light reaching surface S1, otherwise causing double images by reflecting from surface S1, may pass through surface S1 without reflection at surface S1.

In certain example embodiments, a method of making the windshield 1 is provided. The first and the second spaced-apart glass substrates 21, 22 may be provided. The polymer-inclusive interlayer 3 may be provided between the first and second glass substrates 21, 22. The AR coating 4 may be provided on one of the surfaces S1 or S4. The first and second glass substrates 21, 22 may be laminated together using the polymer-inclusive interlayer 3 to form the vehicle windshield 1. As a source of the glass substrates 21, 22, flat glass substrates may be used. The flat glass substrates may be heat treated (e.g., thermally tempered, heat bent, and/or heat strengthened). This heat treatment typically is at temperatures of at least 500° C., and more preferably at least about 580° C. During this heat treatment, in certain example windshield applications, the flat glass substrates may be bent to the desired curved shape for the desired windshield application. The glass substrates 21, 22 may be made of a soda-lime-silicate glass having a glass composition defined by ISO 16293-1: 2008. In some embodiments, the glass substrates may be made of almino-silicate glass or borosilicate composition.

The polymer-inclusive interlayer 3 may include any suitable material, including polyvinyl butyral (PVB) or ethylene vinyl acetate (EVA). The interlayer 3 is provided between the glass substrates 21, 22 and is laminated therebetween. In the lamination process, which typically involves autoclaving, the two glass substrates 21, 22 with the interlayer 3 therebetween may be heated to typical laminating temperature(s) with or without a predetermined pressure to laminate the glass substrates 21, 22 to one another and also form the vehicle windshield 1. The first and second spaced apart glass substrates 21, 22 thus sandwich the polymer-inclusive interlayer 3. In certain embodiments, the polymer-inclusive interlayer 3 may be substantially uniform in thickness without a wedge angle, in the assembled windshield 1.

In some embodiments, the windshield 1 may be formed with a polymer-inclusive interlayer having a wedge shape. The wedge-shaped polymer-inclusive interlayer may create a second reflected image which may be aligned with a first reflected image, eliminating a double image. A wedge-shaped interlayer may be effective for a limited number of drivers, as the height of a driver may affect the effectiveness of a wedge-shaped interlayer. Thus, an AR coating may be combined with a wedge-shaped interlayer to further improve the elimination or substantial elimination of double images. The polymer-inclusive interlayer may be wedge-shaped across the entire windshield 1 or only in a selected portion of the windshield 1. In some further embodiments, the windshield 1 may be formed with a polymer-inclusive interlayer having a polarization rotator 2 (e.g., phase difference plate, wave plate or retarder plate). A polarization rotator 2 formed with the polymer-inclusive interlayer can be constituted of an optical component or components including optical parts such as, e.g., half-wave plates or quarter-wave plates. The polymer-inclusive interlayer having a polarization rotator 2 may be a stack of a polymer interlayer, a half-wave plate film and a polymer interlayer. With incorporation of such a polarization rotator 2, the light rays emitted from the image source 5 can be S-polarized light rays or P-polarized light rays which are shifted in terms of polarization by the polarization rotator 2, so that light rays are only reflective from one glass surface and the light rays otherwise causing a double image may be eliminated or blocked effectively. Even where a windshield 1 includes a polarization rotator 2, a double image is possible where the rotation is not complete, and an AR coating 4 may be used on surface S1 or Surface S4 to eliminate or substantially eliminate the double images.

The AR coating 4 may be formed on the laminated windshield, the heat bent glass substrate (21 or 22), or the flat glass substrate before being heat treated. The AR coating 4 may be any suitable material, including a $MgF_2$ coating, a porous (nano-structured) $SiO_2$ coating, or a multi-layered coating made of dielectric layers. The AR coating 4 may preferably be formed on a main surface of the glass substrate (21 or 22) via physical vapor deposition (sputtering) process, chemical vapor deposition, sol-gel process or the like.

In some embodiments, a heatable and/or bendable functional coating or film having a function, such as low-emissivity, infrared-reflection (IRR) and infrared-absorption (IRA) optionally may be disposed on or between the glass substrates 21, 22. An IRR coating or other reflective coatings may have reflectivity in the visible light wavelength range and may be used to reflect the projected image to a user 6. The reflective coating may provide an increased reflectivity over what is reflected from glass surfaces which may be preferable in certain embodiments. In some embodiments the reflective coating may be provided on a glass surface, which may face within the windshield 1 or may be on an outer windshield 1 surface S1 or S4. In some further embodiments, the reflective coating may be provided on a film laminated within or applied to the glazing.

In further embodiments, an optional water repellent or anti-fog functional coating or film may be disposed on the surface S1 and/or the surface S4 after the heat treatment.

Figure 2:
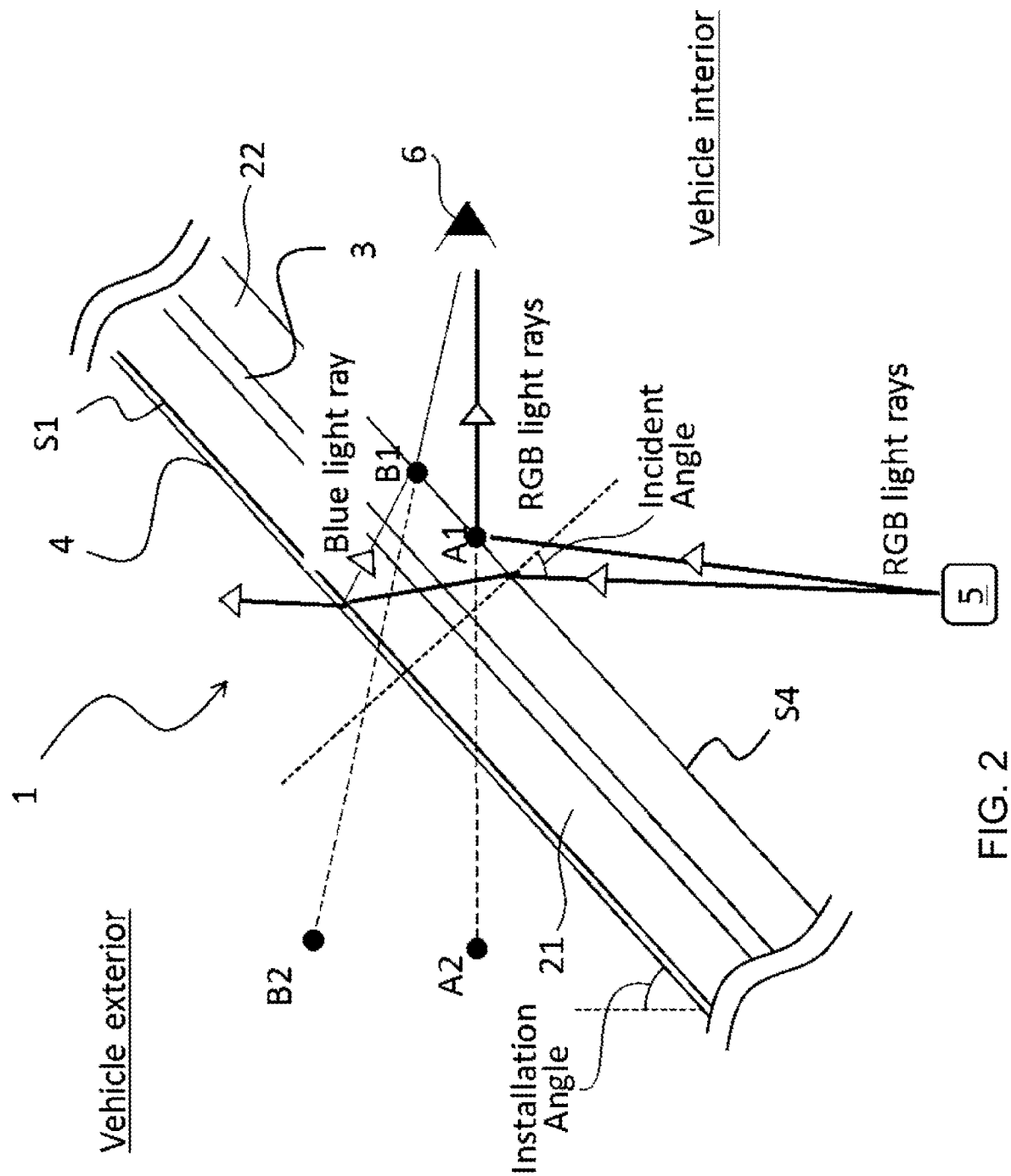
FIG. 2 illustrates schematic optical paths at a windshield with a head-up display system as a prior art.

The windshield 1 shown in FIG. 2 corresponds to a comparative example against FIG. 1. In FIG. 2, the first and second wavelengths are not substantially the same. If the first wavelength is in the blue light region and the second wavelength is in the red light region, some of blue light rays may be reflected at the AR coating 4. Thus, the user 6 may observe a virtual image A2 based on a reflected image A1 of the RGB light rays at surface S4 and a virtual image B2 based on a reflected image B1 resulting from some of the blue light rays reflecting from the surface S1.

Figure 3:
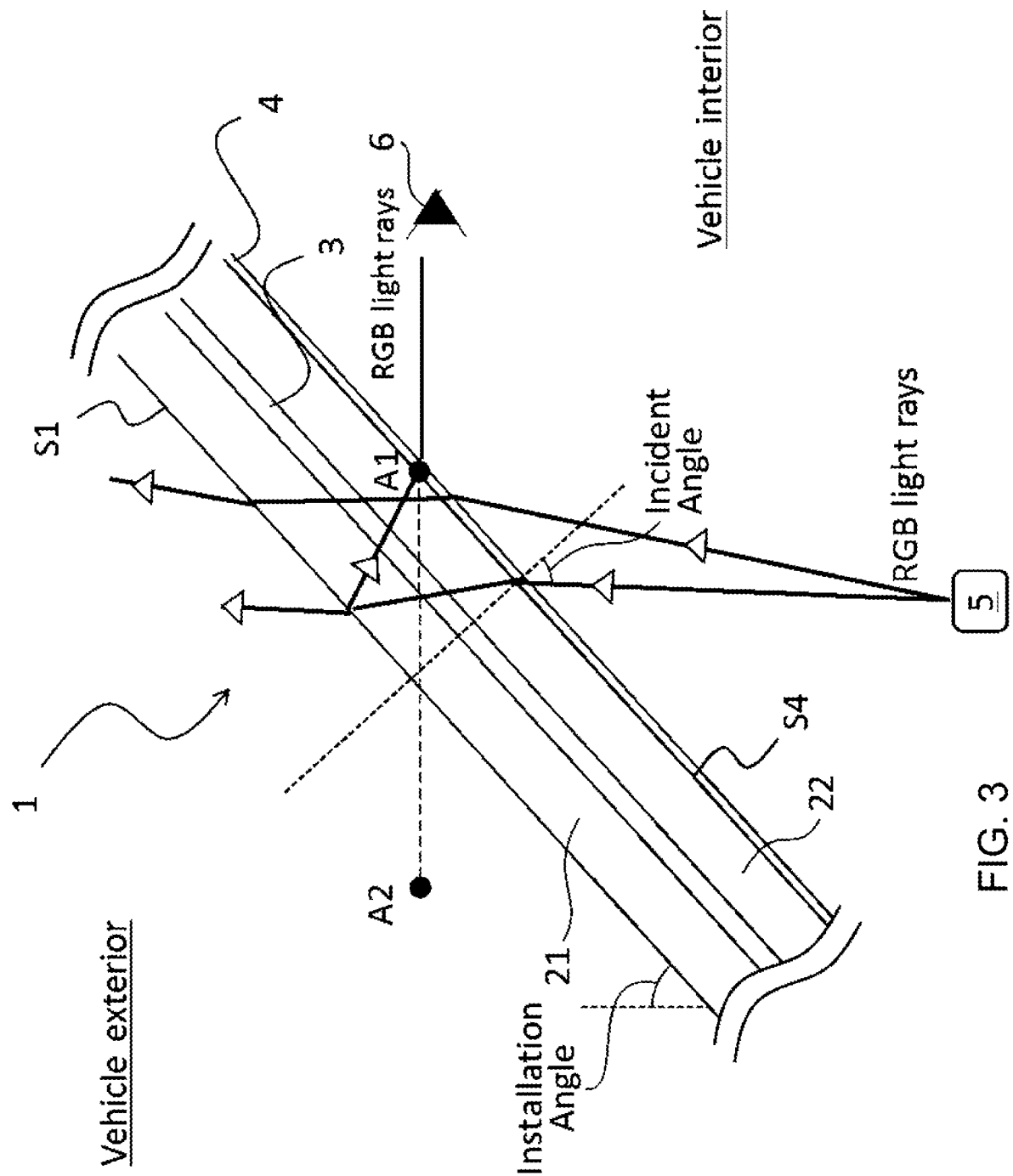
FIG. 3 illustrates schematic optical paths at a windshield with a head up display system in a second embodiment of the present disclosure.

As shown in FIG. 3, windshield 1 may include the AR coating 4 on the surface S4. A user 6 may observe a virtual image A2 based on a reflected image A1 of the RGB light rays off of the surface S1. Since reflectance of light rays off of the surface S4 can create a ghost image, eliminating the reflection from surface S4 by the AR coating 4 thereon may eliminate the ghost image for the user 6.

The light rays (the RGB light rays) from image source 5 including display panels, such as LCD displays, OLED displays and CRT displays, may have a light strength spectrum over at least part of the visible light wavelength range, showing the strongest light strength at a first wavelength within the range. For example, the first wavelength of some CRT displays may preferably be from 600 nm to 700 nm, the first wavelength of some OLED displays may preferably be from 550 nm to 650 nm, and the first wavelength of some LCD display may preferably be from 500 nm to 600 nm or from 400 nm to 500 nm depending on a type of back light of the LCD panel.

It may be difficult to obtain an AR coating having AR property in the complete range of visible light wavelengths. The anti-reflective property of the AR coating may depend on wavelength. The AR coating 4 may have a broad reflectance spectrum over the visible light wavelength range in a direction of the light rays, showing the AR property and the lowest reflectance at a second wavelength within the range. In certain embodiments, the AR property may be less than or equal to 2.5% of reflectance of light ray with incident angle of 45 degrees to the AR coating. In the windshield 1, by matching the first and the second wavelength to be substantially the same, the double images may be eliminated or substantially eliminated.

Figure 4:
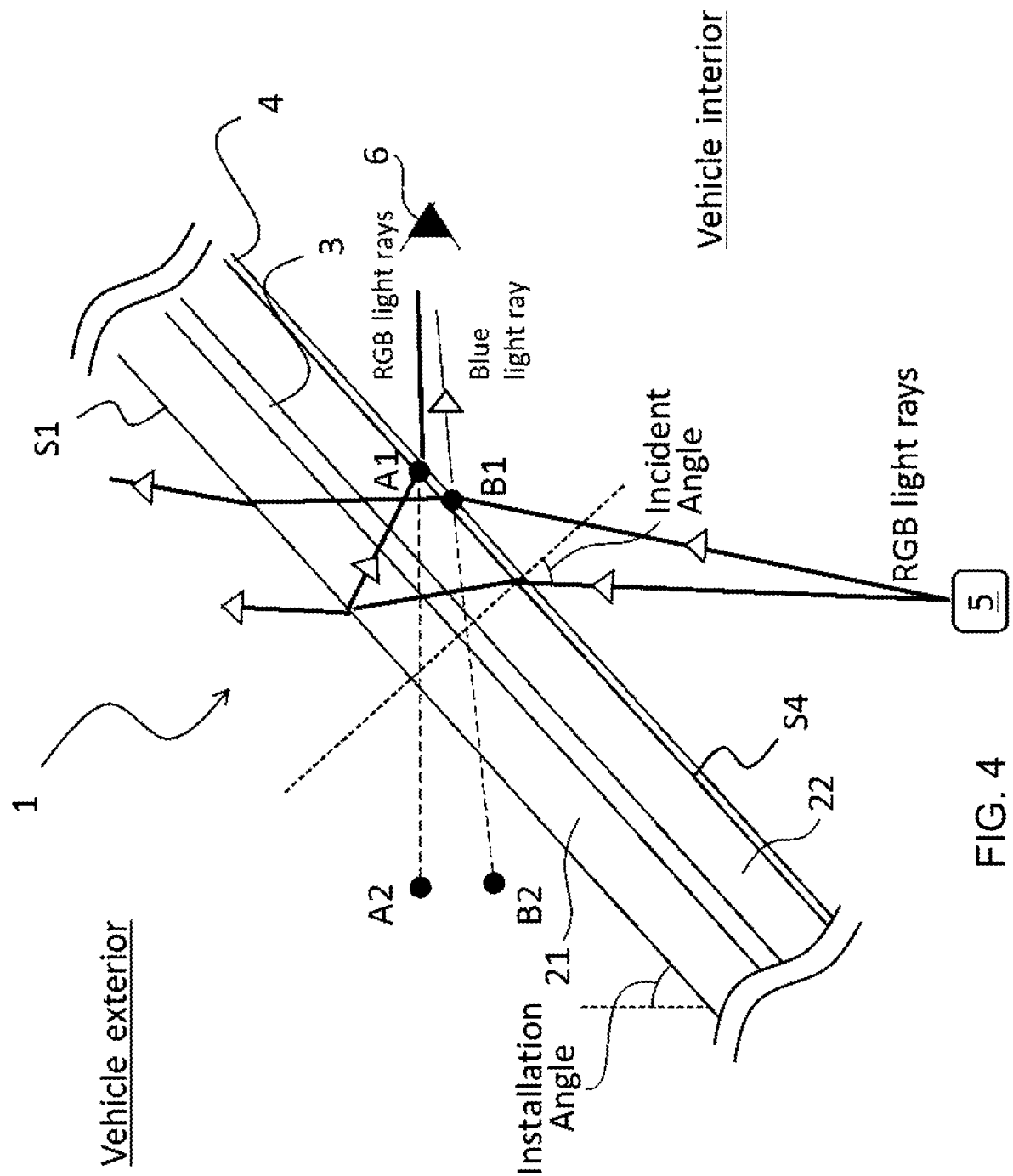
FIG. 4 illustrates schematic optical paths at a windshield with a head up display system as a prior art.

The windshield 1 shown in FIG. 4 corresponds to a comparative example against FIG. 3. In FIG. 4, the first and the second wavelengths are not adjusted to be substantially the same. If the first wavelength is in the blue light region and the second wavelength is in the red light region, some of blue light rays are reflected at the AR coating 4. Thus, the user 6 may observe a virtual image A2 based on a reflected image A1 of the RGB light rays at S1 and a virtual image B2 based on a reflected image B1 resulting from the some of the blue light rays reflecting off of the surface S4.

The inclusion of an anti-reflective coating on the inner side of the front windshield may covey a number of advantages. For example, it may reduce the internal reflection (e.g., of the dashboard), which may become more problematic where an installation angle of a windshield is reduced. The installation angle of the windshield may be defined as an angle between an upward extending direction of the glass substrate and a vertical direction. It may also be possible to increase the transmission of visible light. Additional solar control possibilities also are presented. With a higher light transmission, it may be possible to build more efficient solar control products, e.g., by increasing transmission or reflection while still maintaining at least about 70% visible light transmission. These advantages may be maintained by the arrangements of certain example embodiments, which also may enable a standard PVB (without wedge-shaped) to be used in windshields, even when head-up displays are implemented in some embodiments. It will be appreciated that the anti-reflective coatings of certain example embodiments may provide and/or serve as a complement to these and/or other example advantages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vehicle windshield for use with a head-up display system, comprising:
    a first substrate facing a vehicle exterior;
    a second substrate facing a vehicle interior;
    a polymer-inclusive interlayer provided between the first and second substrates;
    an image source configured to direct, towards the second substrate, light rays corresponding to an image to be formed substantially by means of reflection from an interior surface of the second substrate and seen by a viewer; and
    an anti-reflective coating provided on an exterior surface of the first substrate for preventing at least some of the light rays from being reflected off of the exterior surface of the first substrate,
    wherein the image source has a light emission profile with a light strength spectrum at least partially over a visible light wavelength range, showing a strongest light strength at a first wavelength within the visible light wavelength range,
    wherein the anti-reflective coating has a broad reflectance spectrum over at least part of the visible light wavelength range in a direction of the light rays, showing a lowest reflectance at a second wavelength within the visible light wavelength range,
    wherein the first wavelength substantially matches the second wavelength, and
    wherein the polymer-inclusive interlayer comprises a polarization rotator, and wherein the light rays comprise S-polarized light rays or P-polarized light rays.

2. The vehicle windshield according to claim 1, wherein the first wavelength is within 50 nm of the second wavelength.

3. The vehicle windshield according to claim 1, wherein the first wavelength is from 400 nm to 500 nm.

4. The vehicle windshield according to claim 1, further comprising a reflective coating.

5. The vehicle windshield according to claim 4, wherein the reflective coating comprises an infrared-reflective coating.

6. The vehicle windshield according to claim 1, wherein the polymer-inclusive interlayer has a substantially uniform thickness.

7. The vehicle windshield according to claim 1, wherein the light rays are non polarized light rays, S-polarized light rays, or P-polarized light rays.

8. The vehicle windshield according to claim 1, wherein the light rays emitted from the image source have a full-colored light spectrum.

9. A vehicle windshield for use with a head-up display system, comprising:
    a first substrate facing a vehicle exterior;
    a second substrate facing a vehicle interior;
    a polymer-inclusive interlayer provided between the first and second substrates;
    an image source configured to direct, towards the second substrate, light rays corresponding to an image to be formed substantially by means of reflection from an exterior surface of the first substrate and seen by a viewer; and
    an anti-reflective coating provided on an interior surface of the second substrate for preventing at least some of the light rays from being reflected off of the interior surface of the second substrate,
    wherein the image source has a light emission profile with a light strength spectrum at least partially over a visible light wavelength range, showing a strongest light strength at a first wavelength within the visible light wavelength range,
    wherein the anti-reflective coating has a broad reflectance spectrum over at least part of the visible light wavelength range in a direction of the light rays, showing a lowest reflectance at a second wavelength within the visible light wavelength range,
    wherein the first wavelength substantially matches the second wavelength, and
    wherein the polymer-inclusive interlayer comprises a polarization rotator, and wherein the light rays comprise S-polarized light rays or P-polarized light rays.

10. The vehicle windshield according to claim 9, wherein the first wavelength is within 50 nm of the second wavelength.

11. The vehicle windshield according to claim 9, wherein the first wavelength is from 400 nm to 500 nm.

12. The vehicle windshield according to claim 9, wherein the polymer-inclusive interlayer has a substantially uniform thickness.

13. The vehicle windshield according to claim 9, wherein the light rays are non polarized light rays, S-polarized light rays, or P-polarized light rays.

14. The vehicle windshield according to claim 9, wherein the light rays emitted from the image source have a full-colored light spectrum.

15. The vehicle windshield according to claim 9, further comprising a reflective coating.

16. The vehicle windshield according to claim 15, wherein the reflective coating comprises an infrared reflective coating.

* * * * *